Patented Feb. 18, 1936

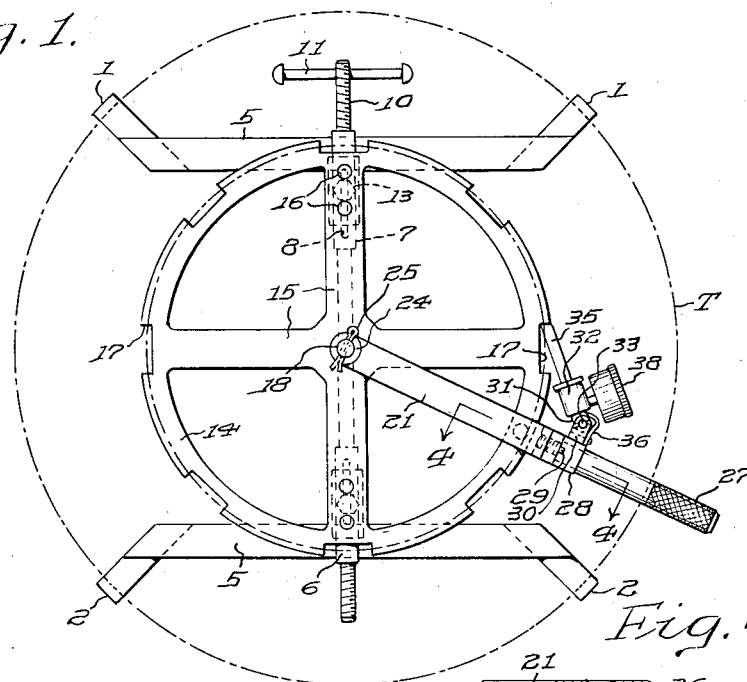
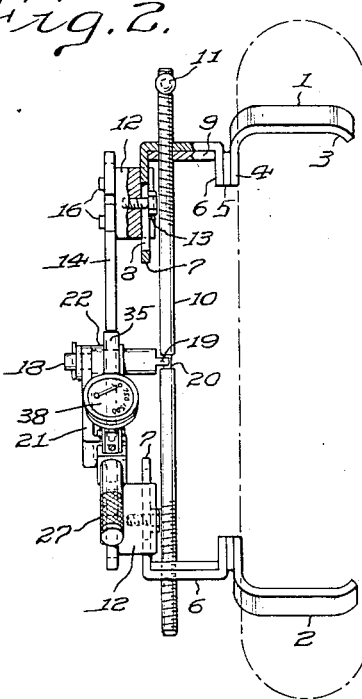
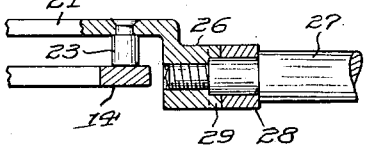
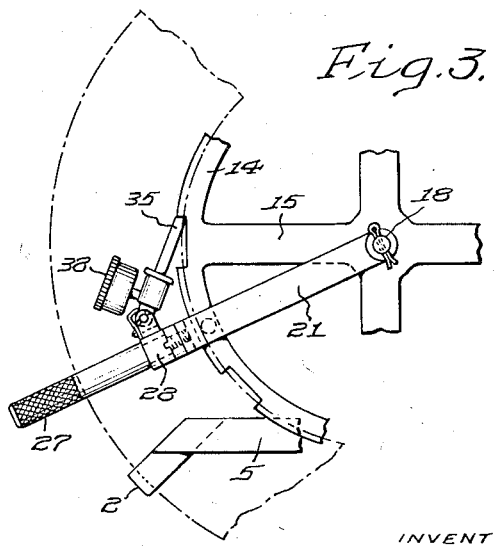

2,030,914

UNITED STATES PATENT OFFICE 2,030,914

BRAKE TESTING APPARATUS

Merlin Hugh Evans and James H. Woodhouse, Elmira, N. Y., assignors to Evanwood Corporation, Elmira, N. Y., a corporation of New York Application December 11, 1934, Serial No. 756,933

7 Claims. (Cl. 265—1)

This invention relates to apparatus for testing the brakes of automotive vehicles, particularly those having pneumatic tires, and is especially directed to the provision of an adjustable device capable of being attached to vehicle wheels of different sizes comprising means for indicating the relative force required to rotate the several wheels individually against the frictional resistance to such rotation offered by the brakes when applied.

Heretofore, automobile brakes have usually been adjusted either by a "trial and error" procedure in which the mechanic determines the braking force by the "feel" of each wheel when jacked up and the brakes applied, or else by means of apparatus provided with an individual gauge for each wheel which when actuated in testing the brakes is intended to give an indication of the braking force applied to that wheel, but these testing machines are extremely expensive, non-portable, and require a large amount of floor space. Moreover, it is difficult if not impossible to maintain the gauges precisely uniform in their reaction to equal forces, so that erroneous readings are frequently obtained, with consequent faulty adjustment of the brakes.

While we are aware that for the purpose of avoiding the objections to these commonly used methods of testing, it has been proposed to provide means for attachment to each individual wheel when that wheel is jacked up or elevated from the vehicle supporting surface and to then rotate said wheel against the force of its brake through the medium of the apparatus and derive from such operation an indication of the brake adjustment, as far as we are informed no device of this kind has been fully satisfactory for its intended purposes.

Our invention, broadly, relates to testing means of this general type in that our device is designed for application to the individual wheels of an automobile when jacked up or held in raised position with the brake pedal suitably blocked so as to apply the brakes, but constitutes an improvement in and possesses advantages over devices of this character heretofore known in convenience of operation and greater accuracy in determination of the relative forces applied by the brakes, whereby satisfactory adjustment of the latter may be readily effected.

A principal object of the present invention, therefore, is the provision of brake testing apparatus adapted for securement successively to the wheels of an automobile, comprising means for determining the relative forces required to rotate the wheels against frictional resistance to such rotation offered by the brakes.

Another object of the invention is to provide apparatus of the character aforesaid adapted for operative attachment successively to the several wheels of the automobile in such manner that each wheel may be rotated in the direction corresponding to forward movement of the vehicle in testing and/or adjusting the brake associated with such wheel.

Other objects, purposes and advantages of the invention are hereinafter more fully set forth or will be understood from the following description of brake testing apparatus constructed in accordance therewith, which we have found convenient and satisfactory in actual use.

In the accompanying drawing illustrating a preferred embodiment of our invention, Fig. 1 is a side elevation of the apparatus in operative relation to an automotive vehicle wheel the tire of which is diagrammatically indicated in broken lines;

Fig. 2 is an end elevation thereof partly in vertical section;

Fig. 3 is a fragmentary side elevation corresponding to Fig. 1 but showing a certain parts of the apparatus in position for rotating a wheel in testing a brake in the direction, relatively to the axis of the device, opposite to that of Fig. 1, as for example, when testing the brake of a wheel on the opposite side of the vehicle; and Fig. 4 is an enlarged fragmentary detail section on the line 4—4 in Fig. 1.

In the several figures, like characters are used to designate the same parts.

As indicated, the apparatus is designed to be directly applied successively to each wheel of the vehicle in testing the brakes respectively associated therewith and when so applied is supported on the wheel by means contacting the outer periphery of the wheel as a whole, for example, the tread of the tire T.

Such supporting means include two pairs of fingers 1, 2 each formed of strip steel or like material bent to angular shape and having one branch slightly crimped over as at 3 to assist in embracing the tire, with the other branch 4 riveted, welded or otherwise secured to an end of a cross bar 5 of which one is associated with each pair of fingers.

Adjacent the center of each cross bar is similarly secured a generally U-shaped bracket 6 the center part of which extends at right angles to the plane of the bar, while one leg engages the latter and the other or outer leg 7 lies in parallelism with the plane of the bar but at right angles to its length and is provided with a closed slot 8. Within the center part of each bracket is desirably secured a reinforcing plate 9, and the plate and bracket are drilled and threaded for the reception of one end of a draw bar 10. The latter is oppositely threaded at its ends and the threads in the brackets are correspondingly opposite in pitch so that rotation of the draw bar moves the brackets in opposite directions, i. e., when the draw bar is rotated in one direction the brackets are caused to approach each other and when it is rotated in the opposite direction, they are caused to recede from each other, the rotation of the bar being effected by means of a headed rod 11 slidably disposed in a hole in one of its ends or by any other suitable means.

A block 12 having a groove in its inner face adapted to receive the adjacent bracket leg 7 is associated with each of the latter, and a cap screw 13 is slidably extended through the slot 8 and into a threaded hole in the bottom of the adjacent block groove; hence, the brackets 6 can slide relatively to the blocks within the limits permitted by the length of the grooves but are held in the latter by the heads of the cap screws which overlie the edges of the slots.

Upon the blocks 12 is supported a rack preferably comprising a circular rim 14 and integral spokes 15 extending therefrom to meet at its axis. Two of these spokes are respectively fastened to the outer faces of the blocks 12 as by rivets 16, and the rim of the rack is provided with a plurality of notches 17 in its periphery and with a hole at its axis through which a pin 18 extends. This pin is provided at its rear end with a jaw 19 embracing draw bar 10 in a groove 20 at its midpoint whereby the draw bar may be rotated relatively to the pin and rack in moving the cross bars and tire engaging parts of the device in and out although its longitudinal movement relatively to the pin is inhibited. The outer end of the pin loosely supports an actuating bar 21 spaced from the rack by a collar 22 on the pin 18 and by a stud 23 which slidably engages the face of rim 14. The bar is held upon the pin 18 in any convenient manner as by a washer 24 and a cotter pin 25. The free end of bar 21 is bent-over at right angles and a block 26 is formed thereon or secured thereto on its outer face, and these parts are drilled and threaded to receive the inner end of an operating handle 27 which is correspondingly threaded. This handle is preferably long enough to extend well beyond the tire when the apparatus is in operative position on the wheel and, as clearly shown in Fig. 4, is of reduced diameter between its threaded end and its main body portion so that it provides a seat adapted to receive a gauge block 28 which is disposed between the face of bar block 26 and the shoulder at the end of the reduced portion of the handle, and to prevent rotation of the gauge block the bar block is provided with diametrically disposed lugs 29 adapted to enter complementary slots in the gauge block when the handle is screwed home. However, when the handle is unscrewed a few turns, the gauge block may be lifted slightly to disengage lugs 29 from the slots and permit the block to be rotated about the handle through an arc of 180°, after which the handle bar may be again screwed down to enter the lugs respectively in the opposite slots for a purpose which will hereinafter more fully appear. The gauge block carries a forked lug 30 which receives a complementary lug 31 integral with one end of a pressure cylinder 32 of an hydraulic pressure gauge assembly whch is thus maintained in pivotal relation with the block by a pin 33. A plunger 35 extends from the opposite end of the cylinder for engagement in notches 17 of rack rim 14 while a leaf spring 36 secured to the forked lug 30 bears on lug 31 to yieldingly urge the gauge assembly toward the rack and hence insure engagement of the plunger in a notch in the latter when the handle is moved relatively thereto. A suitable gauge 38 is connected to the cylinder for indicating the pressure set up in the latter by movement of the plunger therein and is provided with an indicating dial and needle of a usual type in gauges of this character, the dial being calibrated in pounds or any other convenient unit.

While we have referred to an hydraulically operated gauge assembly since we usually prefer to utilize a gauge of that type, it will be understood that a spring actuated gauge or, in fact, any other means suitable for indicating the pressure set up between the handle and the rack during the operation of the testing apparatus may be substituted therefor.

In testing the brakes of an automobile with the aid of apparatus of the character just described, the brake pedal is first blocked in brake-applying position by any suitable means as, for example, a jack engaging the pedal at one end and the seat support or other convenient abutment at the other and exerting a constant pressure against the pedal. The testing apparatus is applied to the tire of one wheel, either before or after it is jacked up, the tire engaging fingers having first been separated sufficiently to readily pass over the tire, and the draw bar is then rotated in the proper direction to draw the cross bars together and thereby effect engagement of the fingers with the periphery of the tire. As the fingers are rigidly secured to the respective cross bars, it is evident that a drawing together of the latter by means of the draw bar insures substantially accurate centering of the device on the wheel so as to bring the axis of the rack in substantial alignment with the axle of the wheel. After the draw bar has been set up sufficiently to hold the device tightly to the tire and the wheel jacked up, if this has not already been done, the handle is moved to effect engagement of the gauge plunger in a notch of the rack, and the wheel then rotated by means of the handle. Since the force applied to the handle is transmitted to the rack and hence to the wheel through the plunger of the gauge cylinder, the pressure registered on the gauge is proportional to the amount of force applied to the handle. Thus, the highest point reached by the gauge needle in initiating rotation of the wheel by means of the handle indicates the degree of force necessary to set the wheel in motion against the resistance of its brake while the highest point reached by the needle during continued rotation of the wheel at constant speed indicates the degree of force necessary to maintain its rotation against such resistance once it has been initiated.

These readings thus indicate the character of adjustment required to produce the desired braking action, and the brakes are tightened or loosened accordingly, usually by several increments of adjustment, and when the handle moves to a position inconvenient for reading the gauge or rotating the wheel, it may be backed around to a more convenient one, with the plunger engaging some other notch in the rack. Thus, the wheel may readily be moved through one or more complete revolutions by successive steps, and readings for the different portions of the wheel travel noted so that the final adjustment can be made so as to take into account any inequalities in the braking action in different sectors as the wheel moves therethrough due to high points on the brake shoe linings, lack of trueness in the brake drum, or other causes which, as is well known, tend to produce uneven braking.

After the final adjustment has been made for the wheel to which the apparatus is initially attached, it is removed therefrom by loosening the draw bar and thereafter applied in a similar manner to the other wheel of the same pair preparatory to adjustment of its brake to give, preferably, the same reading on the gauge. However, as it is desirable to rotate all the wheels in the same direction to obtain maximum accuracy of equalization, the pressure gauge is preferably reversed before the brake of the second wheel is adjusted by unscrewing the handle a sufficient amount to permit the gauge to be swung through an arc of 180° and then again setting up the handle, thereby reversing the relation of the plunger 35 to the rack from the position of Fig. 1 to that of Fig. 3 or vice versa so it will engage the rack notches in the opposite direction.

In like manner, the other pair of wheels may be tested and usual adjustments made to effect proper braking action, it being of course customary to have the brakes on the rear wheels set up a little tighter than those on the front wheels if there are any such brakes thereon; as the gauge readings for the several wheels correspond to the tightness of the brakes, any desired adjustment thereof may me made, and each pair of brakes thus readily equalized.

It will be apparent that the apparatus is readily portable, and is relatively inexpensive to manufacture; that it can conveniently be handled and operated by an ordinary mechanic; that it does not require a large amount of floor space to be devoted exclusively to it in a garage, service station or other brake testing establishment; that it may very quickly be applied to and removed from the wheels and is self-centering thereon, thus greatly expediting the operation of adjusting the brakes; moreover, since the same gauge is used to test the braking force of the brakes on each of the several wheels, it is unnecessary that the gauge be absolutely accurate in the pressure indicated thereby for any error in the gauge is perpetuated throughout the entire test and appears in all the readings so that the relative force applied to the several wheels is readily determinable without the necessity of making allowance for any gauge inaccuracy which may be present.

While we have herein described a preferred embodiment of the invention with considerable particularity, it will be understood that we do not intend to limit or confine ourselves in any way thereto as changes and modifications in the form, structure and arrangement of the several parts and in the mode of assembly and operation thereof will readily occur to those skilled in the art and may be made if desired without departing from the spirit and scope of the invention as defined in the appended claims.

Having thus described our invention, we claim and desire to protect by Letters Patent of the United States:

1. In brake testing apparatus, a substantially circular notched rack, a pressure cylinder, a plunger adapted to selectively enter the notches in the rack, extending into the cylinder and relatively movable with respect thereto, pressure responsive indicating means interconnected with the cylinder, a lug on the cylinder, supporting means for the cylinder comprising a bar pivoted to the rack, an internally threaded block carried by the bar having diametrically opposed projections on its outer face, a supporting block having grooves adapted to receive said projections, means pivotally interconnecting said lug to said supporting block, a spring carried by the supporting block operative to urge the lug in one direction on its pivot, and a handle extending through the supporting block and into the threaded block to releasably maintain said blocks in mutual engagement.

2. Brake testing apparatus of the class described comprising a pair of cross bars, a pair of tire engaging fingers carried by each cross bar, brackets respectively secured to the cross bars having internal threads of opposite pitch, a rotatable draw bar having external threads of opposite pitch cooperable with the bracket threads to move the brackets in opposite directions, blocks respectively associated with the brackets, means operative to maintain each bracket in sliding engagement with its block, a circular rack supported from the blocks, and means operable to apply a force against the rack tending to turn it about its axis when the fingers are in gripping engagement with a tire including pressure responsive means adapted to afford visual indication of the amount of such force.

3. In brake testing apparatus of the class described, a circular notched rack, means for removably securing the rack to a wheel tire, a bar pivoted at the axis of the rack, an operating handle threaded into the bar and extending in prolongation thereof beyond the periphery of the rack, a notch engaging element, supporting means therefor seated adjacent the bar operatively interconnected with the handle and rotatable about the axis thereof, and means releasably operative to inhibit said rotation when the supporting means is in either of two diametrically opposed positions and the handle is in fully assembled relation with the bar.

4. In brake testing apparatus of the class described, a circular notched rack, a bar pivoted adjacent the axis of the rack extending radially outward therefrom, a handle having one extremity threaded into the bar and a portion of reduced diameter adjacent said extremity, a plunger operable to selectively engage the notches in the rack, means for supporting the plunger in operative relation to the rack having a bore adapted to receive said reduced portion of the handle, and interengageable means respectively carried by said bar and said supporting means cooperable with the handle to selectively but releasably maintain said supporting means in fixed relation to the bar in either of two diametrically opposed positions whereby by reversal of the supporting means from one of said positions to the other the plunger may be disposed so as to engage the rack notches from opposite directions.

5. In brake testing apparatus of the class described, a circular notched rack, means for removably securing the rack to a wheel tire, a bar pivoted at the axis of the rack, a handle operatively fixed with respect to the bar, a notch engaging element movable with the bar and handle relatively to the rack, and supporting means therefor movable relatively to the bar and handle through an arc of 180° to thereby enable the element to be disposed on either side of the bar to engage the notches in the rack from opposite directions in accordance with the direction of movement of the bar about said axis.

6. In brake testing apparatus of the class described, a circular notched rack, means for removably securing the rack to a wheel tire, a bar pivoted at the axis of the rack, a notch engaging element, a pressure gauge operable thereby, and means adapted to support said element and said gauge in either of two diametrically opposed positions with respect to the bar to thereby dispose the element for operative engagement with opposite sides of the notches in the rack to actuate the gauge in accordance with the direction of movement of the bar about said axis.

7. In brake testing apparatus of the class described, a circular notched rack, means for removably securing the rack to a wheel tire, an operating lever pivoted at the axis of the rack, a notch engaging element, a pressure gauge interposed between the element and the lever for actuation by the former, and means adapted to support the element and the gauge upon the lever in either of two diametrically opposed positions with respect thereto to thereby dispose the element for cooperation with opposite sides of the notches to actuate the gauge in accordance with the direction of movement of the bar about said axis.

MERLIN HUGH EVANS.
JAMES H. WOODHOUSE.